US008792463B2

(12) United States Patent
Tocze et al.

(10) Patent No.: US 8,792,463 B2
(45) Date of Patent: Jul. 29, 2014

(54) METHOD FOR MANAGING A DISTRIBUTION OF BANDWIDTH IN A COMMUNICATIONS NETWORK, CORRESPONDING STORAGE MEANS AND SLAVE NODE

(75) Inventors: Lionel Tocze, Saint Domineuc (FR); Laurent Frouin, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 12/904,971

(22) Filed: Oct. 14, 2010

(65) Prior Publication Data

US 2011/0085523 A1 Apr. 14, 2011

(30) Foreign Application Priority Data

Oct. 14, 2009 (FR) ...................................... 09 57191

(51) Int. Cl.
*H04W 72/12* (2009.01)
(52) U.S. Cl.
USPC ......................................................... 370/337
(58) Field of Classification Search
CPC .................................................... H04W 72/12
USPC .......................................................... 370/337
See application file for complete search history.

(56) References Cited

U.S. PATENT DOCUMENTS 6,826,401 B1 11/2004 Morvan et al.
7,159,042 B1 1/2007 Morvan et al.

(Continued)

FOREIGN PATENT DOCUMENTS

| EP | 2079193 A1 | 7/2009 |
| WO | 02/065707 A2 | 8/2002 |
| WO | 2007/049204 A1 | 5/2007 |
| WO | 2008/060879 A2 | 5/2008 |

OTHER PUBLICATIONS

U.S. Appl. No. 12/905,060, filed Oct. 14, 2010. Applicant: Patrice Nezou, et al.

(Continued)

*Primary Examiner* — Sulaiman Nooristany
(74) *Attorney, Agent, or Firm* — Fitzpatrick, Cella, Harper & Scinto

(57) ABSTRACT

A method is proposed for managing access to a communications network clocked in transmission cycles by a master node characterized in that, during a given transmission cycle, a slave node of the network performs steps for: obtaining (705) an active access sequence applicable for the given transmission cycle and a piece of information on duration of relevance associated with the active access sequence obtained; carrying out (740) a first check that at least one packet is received by the slave node during the given transmission cycle, according to the active access sequence; in the event of a positive first check, determining (745, 725, 730, 740) an access sequence for a following transmission cycle as a function of pieces of information contained in the received packet or packets; in the event of a negative first check, determining (725, 727, 710, 715, 720, 750, 755) an access sequence for the following transmission cycle as a function of the piece of information on duration of relevance associated with the active access sequence obtained.

13 Claims, 8 Drawing Sheets

(56) References Cited

U.S. PATENT DOCUMENTS

| | | |
|---|---|---|
| 7,177,307 B2 | 2/2007 | Frouin et al. |
| 7,269,137 B2 | 9/2007 | Bizet et al. |
| 7,460,503 B2 | 12/2008 | Young |
| 7,747,783 B2 | 6/2010 | Morvan et al. |
| 2008/0019347 A1 | 1/2008 | Shin et al. |
| 2008/0261570 A1* | 10/2008 | Baker et al. ............. 455/414.1 |
| 2008/0273610 A1* | 11/2008 | Malladi et al. ............. 375/260 |
| 2009/0143024 A1 | 6/2009 | Tocze et al. |
| 2009/0180465 A1 | 7/2009 | Closset et al. |
| 2009/0279565 A1* | 11/2009 | Kamath et al. ............. 370/442 |
| 2010/0195556 A1 | 8/2010 | Tocze et al. |

OTHER PUBLICATIONS

French Search Report dated Jun. 24, 2010 in corresponding French Application No. FR 0957191.

* cited by examiner

METHOD FOR MANAGING A DISTRIBUTION OF BANDWIDTH IN A COMMUNICATIONS NETWORK, CORRESPONDING STORAGE MEANS AND SLAVE NODE

This application claims priority from French Patent Application No. FR 0957191, filed on Oct. 14, 2009, the entire contents of which are incorporated by reference herein.

1. FIELD OF THE DISCLOSURE

The field of the disclosure is that of techniques for managing a network. More specifically, the disclosure relates to a technique by which a node subjected to shadowing can remain synchronous with the rest of a wireless communications network, even during a phase for reconfiguring the network.

2. BACKGROUND OF THE DISCLOSURE

Home wireless networks or PANs (Personal Area Networks) are designed to interconnect digital communications devices, for example telephones, personal digital assistants, speakers, television units, multimedia players, telephones, personal digital assistants, etc. situated in proximity to the user. The range of such a communications network is of the order of a few meters.

These networks can be wired (USB, Ethernet, Firewire) but can also rely on the use of a wireless medium. The term used for such a network is "wireless personal area network" or WPAN. The Bluetooth standards (IEEE 802.15.1), UWB, ZigBee (IEEE 802.15.4), IEEE 802.11 or IEEE 802.15.3 are presently the ones most used for this type of network.

Each of these standards proposes its own protocol of access to the physical data transmission layer, for example in order to share the use of a radio band between several apparatuses relative to specific applications needs. Certain of these protocols generally use a time division multiple access (TDMA) mode, which is a multiplexing mode for transmitting several signals on a single channel, that is particularly efficient for managing guaranteed bit rates with high synchronization constraints. This is a time multiplexing mode, the principle of which is that of subdividing the available time between the different connections. By this means, a same carrier frequency can be used by several devices.

Such wireless home networks use varied transmission frequencies ranging from 2.5 GHz to 60 GHz, the latter frequencies being particularly well-suited to transmitting data at very high bit rates over a limited range, for example as a means of connectivity between the different elements of a home cinema. Indeed, for this case of use, the range is limited to about ten meters (sufficient to cover the layout of this type of system in a room) and the bit rates brought into play are very high, beyond one gigabit per second, by the audio as well as video nature, as well as the very high resolution of the information transmitted.

Such wireless systems, although advantageous from the viewpoint of their installation, nevertheless have high sensitivity to interference and masking or shadowing phenomena.

It is therefore interesting to provide this type of system with a method for re-configuring the network (modifying the use of the bandwidth, adding or removing new devices) to overcome the above-mentioned problems of shadowing and ensure the synchronism of use of any new configuration. This configuration will then be able to work transparently, i.e. without perceptibly modifying the function of the system in use, especially by avoiding transmission at an inappropriate time (therefore a send operation that is disturbing) of a node of the network that is unable to receive a TDMA type access sequence information.

Many prior-art solutions propose to process the absence of information of a TDMA type access sequence when a node is unable to receive it through the master node of the network.

For example, the patent document US20080019347 describes a method enabling a node of the network to retrieve descriptive information on the current TDMA type access sequence. The patent document describes a system in which a master node, at each transmission cycle, announces the transmission sequence (or TDMA type access sequence) applicable for the duration of the cycle. A node unable to receive this information therefore loses the use of its time space (or slot) in the cycle. The patent document then proposes to define a period of the transmission cycle during which the node having detected poor reception or an absence of reception of TDMA type access sequence information (during a period known as a "beacon" period) will request another node of the system to re-transmit information characterising this TDMA type access sequence.

One drawback of this approach is that it cannot be used to ensure that the node will receive a TDMA type access sequence information if it is not linked with at least one node which itself has received information from the master node in the current cycle. This node has a very limited available time of resistance to shadowing (one transmission cycle) and does not ensure synchronization during the modification of the TDMA type access sequence.

The patent document U.S. Pat. No. 7,460,503 describes a "beacon" re-transmission technique (capable of containing a representation of the TDMA type access sequence) in which a "slave" node of a PNC (piconet coordinator) node or master node which, during a predefined time slot in the transmission cycle, re-sends the information of the beacon as received from the PNC. This makes it possible either for a node that cannot receive the PNC to know of the existence of the piconet (network) and hence to locate the existence of a network or provides for the most efficient possible co-existence when another neighboring piconet is set up (without any need for preliminary coordination). This technique may also enables a masked or shadowed node of the PNC to remain synchronized with it. One drawback of this approach is that it does not enable synchronization during temporary shadowing between the relay node and the PNC because this relay node acts only when it is capable of receiving information from the PNC.

3. GOALS OF THE DISCLOSURE

An embodiment of the invention is also aimed, in at least one embodiment, at overcoming these different drawbacks of the prior art.

More specifically, it is a goal of at least one embodiment of the invention to provide a technique for making a synchronized re-configuration of a TDMA type access sequence in a network environment subjected to frequent shadowing in order to enable the insertion and/or elimination of nodes in the network or a re-allocation of the bandwidth.

At least one embodiment of the invention is also aimed at providing a technique of this kind enabling a node that undergoes frequent shadowing operations to estimate the TDMA type access sequence configuration in order to continue to use the bandwidth allotted to it without disturbing the other members of the network and to do so even after a configuration and during a relatively lengthy period of time.

It is another goal of at least one embodiment of the invention to provide a technique of this kind in the implementation of a gnaling to re-synchronize a node that has undergone temporary shadowing.

4. SUMMARY

In one particular embodiment of the invention, a method is proposed for managing access to a communications network clocked in transmission cycles by a master node. During a given transmission cycle, a slave node of said network performs steps for:
- obtaining an active access sequence applicable to said given transmission cycle and a piece of information on duration of relevance associated with said active access sequence obtained;
- carrying out a first check that at least one packet is received by said slave node during the given transmission cycle, according to said active access sequence;
- in the event of a positive first check, determining an access sequence for a following transmission cycle as a function of pieces of information contained in said received packet or packets;
- in the event of a negative first check, determining an access sequence for the following transmission cycle as a function of said piece of information on duration of relevance associated with the active access sequence obtained.

Thus, during the obtaining step, the slave node obtains an active access sequence and a piece of information on duration of relevance, enabling it to determine its behavior for the given transmission cycle as well as for the next cycle without disturbing the other communications.

Thus, if this step of the first check is positive, the slave node, on the basis of information contained in said at least one received packet, can determine an access sequence enabling it to participate in communications and to do so at greater length than in the above-mentioned known techniques.

By contrast, if this first check step is negative, i.e. if the node has not received packets coming from the other nodes in progress of the given transmission cycle (this may be due to a shadowing of the node in the case of a wireless network or a loss of data on the transmission line in the case of a wire network), the node will be able to continue participating in the network so long as it believes that it is capable of doing so without disturbing the network through the active access sequence and with the associated piece of information on duration of relevance.

Contrary to the prior-art approaches which do not ensure the synchronization of the node beyond one cycle (and where therefore a master node can re-assign the communications time of said node to another node), this technique gives a solution more resistant to shadowing. In the prior art, once one or more consecutive cycles are shadowed, the node is no longer capable of sending without disturbing the communications or of accurately analyzing the packets received from the other nodes if, in the meantime, there have been for example incoming/outgoing nodes or modifications of network access time slots. Through this technique, this problem can be resolved.

Thus, through this technique, it is not necessary to greatly increase the number of relay nodes to circumvent the problem of shadowing (or loss of data) because by using an estimation of the progress of the working of the network, the node can continue to take part in communications during a relatively lengthy period of time compared with the prior-art solutions. The use of this technique makes it possible to obtain gains in terms of deployment of nodes (it becomes necessary to install a multitude of nodes to relay the packets of a master node) as well as in terms of bandwidth.

Advantageously, in the event of a positive first check, said slave node performs a step for:
- performing a second check to see if one of the received packet or packets comes from the master node;

In addition, in the event of a positive second check, the access sequence for the next transmission cycle is indicated in said packet coming from the master node.

Thus, the slave node obtains an active access sequence and a piece of information on duration of relevance directly from the master node. Consequently, it is these pieces of data that are the most relevant and therefore they will enable it to communicate as long as possible even in the event of shadowing.

Advantageously, if the piece of information on duration of relevance associated with the active access sequence is non-zero, the information on duration of relevance for the next transmission cycle is obtained by reducing the information on duration of relevance for the given transmission cycle.

Thus, the slave node, through the information on duration of relevance for the next transmission cycle, which is obtained by reducing the information on duration of relevance for the given transmission cycle, can inform the slave nodes of the network of the relevance of this piece of information as a function of its value. Thus, the slave nodes of the network can adapt their behavior to the value of the information on duration of relevance modified by another slave node of the network.

Advantageously, in the event of a negative second check, said slave node performs a step for:
- performing a first comparison between the information on duration of relevance associated with said active access sequence obtained and a piece of information on duration of relevance associated with an access sequence indicated in a said received packet;

In addition, the sequence of access for the next transmission cycle is determined as a function of the result of said first comparison.

Thus, the slave node, in performing a first comparison, will determine the most relevant sequence of access (for the next transmission cycle). Thus, the slave node can update the information enabling it to remain synchronous with the other nodes of the network and continue to send data within the network without disturbing the other nodes present in this network.

According to an advantageous characteristic, if the piece of information on duration of relevance associated with said active access sequence is greater than or equal to the piece of information on duration of relevance associated with the access sequence indicated in said received packet, then the access sequence for the next transmission cycle is the active access sequence obtained.

Thus, if the slave node has received instances of information on duration of relevance that are smaller than or equal to its own, from among the different packets coming from the other slave nodes, it keeps its piece of information on duration of relevance and the associated active access sequence because the others would not allow it to communicate for a longer time without disturbances.

Advantageously, if the piece of information on duration of relevance associated with said active access sequence is smaller than the information on duration of relevance associated with the access sequence indicated in said received packet, the piece of information on duration of relevance associated with said active access sequence is replaced by the piece of information on duration of relevance indicated in said received packet, and the access sequence for the next transmission cycle is indicated in said received packet.

Thus, the node will be capable of sending for longer periods of time without disturbing the network.

According to an advantageous characteristic, if the piece of information on duration of relevance associated with said active access sequence is zero, said slave node in addition performs steps for:

performing a third check to ascertain that at least one piece of information on notification of change of sequence has been received by said node during a previous transmission cycle and notifying a subsequent change of access sequence;

in the event of a positive third check, determining the access sequence for the next transmission cycle as a function of a piece of information on access sequence associated with said information notifying a change of sequence;

in the event of a negative third check, preventing send access from said slave node to said network starting from said following transmission cycle.

Thus, when the slave node has a piece of information on zero duration of relevance (in the event of a negative first check or a negative second check), it makes a check to know if it has a piece of information on notification of change of sequence for a future cycle. The next access sequence is determined as a function of a piece of information on access sequence associated with the information on notification of change of sequence. Thus, the slave node can continue to participate in communications of the network even if the network it has undergone modifications (addition/elimination of slave nodes). If not, the slave node must leave the network because it is no longer able to ensure that these send operations will not disturb the network.

According to one advantageous characteristic, in the event of a negative first check, and if the piece of information on duration of relevance associated with the active access sequence obtained is non-zero, the access sequence for the next transmission cycle is equal to the active access sequence.

Thus, when the slave node has not received packets during the given transmission cycle (for example when a shadowing has taken place) and when its piece of information on duration of relevance is non-zero, it can continue to send by using the active access sequence even if the master node has changed its mode of operation. This time can then enable the slave node to transmit control information to the other nodes of the network so that for example these nodes can implement a network of send antennas modifying the radiation of this beam (in the technique known as "beamforming").

The slave node can continue to send because any change in sequence can only be done at the earliest at the end of this duration of relevance. The slave node however must diminish its information on duration of relevance because it must:

either inform the other slave nodes that it has not received information during the the previous transmission cycle and therefore that its relevance is less good; or or because the slave node knows that the application of a new configuration is approaching.

The indicator of duration of relevance therefore acts as an indicator of the instant for applying the change.

According to an advantageous characteristic, the slave node in addition performs a step for:

sending, according to the active sequence obtained, in the given transmission cycle, a packet comprising said active access sequence for the given transmission cycle obtained, and information on the duration of relevance associated with said given access sequence obtained.

Thus, by sending both the active access sequence and the information on duration of relevance, the slave node informs the other slave nodes of the network which themselves also implement the present technique for managing access. By propagating data in this way, a multitude of nodes is covered and therefore this enables the nodes of the network to participate (in sending and/or receiving packets) for a longer period without disturbing the network.

According to one advantageous characteristic, a master node performs a step for:

sending an active access sequence, applicable for the given transmission cycle, as well as a piece of information on duration of relevance associated with said active access sequence sent.

Thus, in sending an active access sequence and an associated piece of information on duration of relevance, the master node enables the slave nodes to remain synchronized even if they no longer receive information for several cycles.

According to an advantageous characteristic, the master node performs a step for:

sending a piece of information notifying a change of sequence, associated with a piece of information on access sequence to be used for a forthcoming cycle, making it possible to inform the slave nodes of a modification of access sequence which will be effective as a function of the value of the associated piece of information on duration of relevance.

Thus, the master node, in sending a piece of information notifying a change of sequence, associated with a piece of information on access sequence to be used for a forthcoming cycle, enables the slave nodes to be synchronized even if they are no longer communicating with the master node for a certain time and even during a re-configuration (a change in configuration of transmission sequence) of the network has taken place.

Another embodiment of the invention pertains to a computer program product comprising program code instructions for implementing the above-mentioned method (in any of its different embodiments) when said program is executed on a computer.

Another embodiment of the invention pertains to a computer-readable storage means storing a computer program comprising a set of instructions executable by a computer to implement the above-mentioned method (in any of its different embodiments).

Advantageously, a slave node belonging to a communications network clocked in transmission cycles by a master node comprises:

means for obtaining an active access sequence applicable to said given transmission cycle and a piece of information on duration of relevance associated with said active access sequence obtained;

means for checking that at least one packet is received by said slave node during the given transmission cycle, according to said active access sequence;

first means for determining an access sequence for a following transmission cycle as a function of pieces of information contained in said received packet or packets, said first means for determining being activated in the event of a positive first check;

second means for determining an access sequence for the following transmission cycle as a function of said piece of information on duration of relevance associated with the active access sequence obtained, said second means for determining being activated in the event of a negative first check.

5. BRIEF DESCRIPTION OF THE DRAWINGS

Other features and advantages of the disclosure shall appear from the following description, given by way of an indicative and non-exhaustive example and from the appended figures, of which:

FIG. 1 presents an example of a wireless communications network in which the nodes implement an embodiment of the invention;

FIG. 2 presents an example of a physical layer working on the principle of a TDMA type network access;

FIG. 3 presents the structure of a node of the network according to one particular embodiment of the invention;

FIG. 4 provides a detailed illustration of the content of a data packet sent by a node of the network according to a TDMA access referred to in FIG. 2, according to a particular embodiment of the invention;

6. DETAILED DESCRIPTION OF ILLUSTRATIVE EMBODIMENTS

Figure 1:
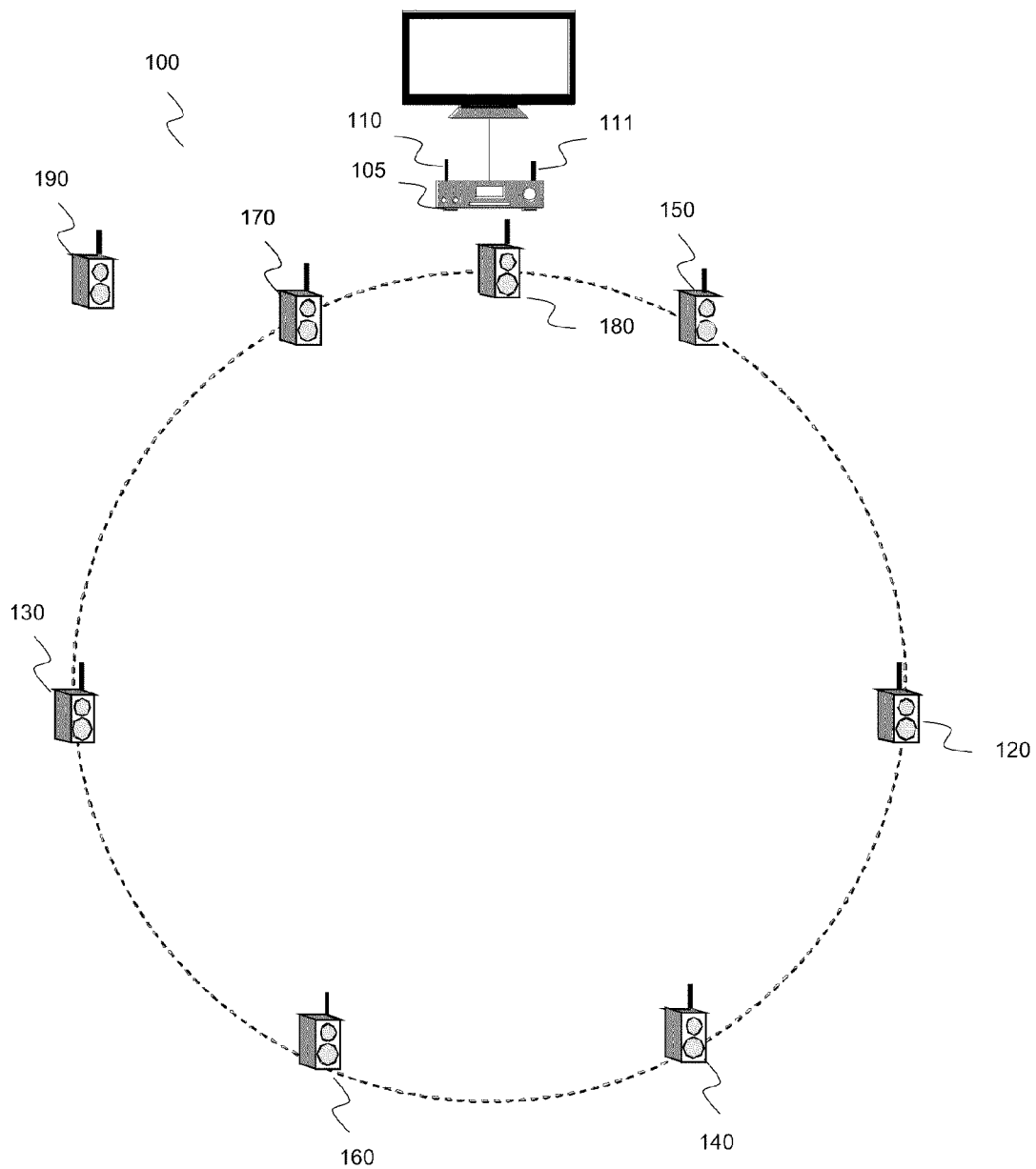

FIG. 1 shows an example of a wireless communications network in which the nodes implement an embodiment of the invention.

The communications system is a 7.1 wireless audio network 100 comprising a source device (or node) 105 with two transmit antennas 110 and 111 as well as a plurality of devices which are both senders and receivers having, for example, only one antenna for sending and receiving (devices 120, 130, 140, 150, 160, 170, 180 and 190). Naturally, the system shown in FIG. 1 is a simplified system intended to simplify the description. This system can be enhanced by numerous communications apparatuses such as laptop computers, screens, projectors, cameras or other sources of contents.

The devices (or nodes) are interconnected by a radio communications links 101. Even if the radio signals are broadcast in every direction, it can happen that certain devices are not able to detect said signals owing to obstacles or the directivity of the antennas. A radio link therefore is not necessarily present between a sender device and any other device of the network. All or part of the set of devices of the network can implement a data relay function: i.e. these devices may re-transmit data received from other devices of the network. The term used then is "relay device" or "relay node". However, it is possible that a device may temporarily be concealed to the extent of not receiving any data during this period of time from the sender or relay devices.

The data stream consists of a plurality of data blocks and is conventionally protected against transmission errors through the use of an error correction code. Generally, the data blocks of the data stream are grouped into packets at the sender device, each packet being then encoded so as to generate a plurality of parity blocks representing redundant information. At the destination device, the received packets are decoded. The decoding consists in correcting potential errors in the data blocks received by using the parity blocks and the multiple receptions to do so.

Figure 2:
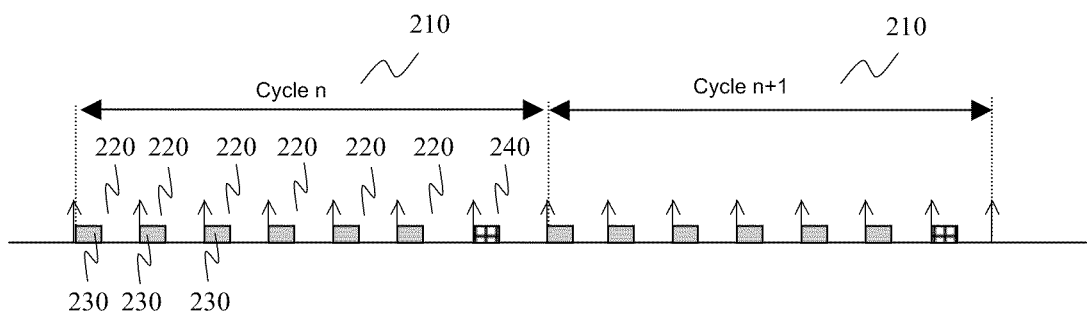

FIG. 2 is an example of a physical layer working on the principle of a TDMA type network access.

The time is divided into transmission cycles 210 within which the nodes successively access the physical layer (or medium) according to a given transmission sequence (or TDMA type access sequence). Each cycle 210 is divided into a number M of time slots (called TDMA slots) so that each of the devices of the network has one time slot (or TDMA slot) 220 per cycle to transmit its data 230. When an apparatus transmits data in its TDMA slot, all the other apparatuses can listen to it (in as much as no shadowing is present). Each TDMA slot can convey zero, one or more blocks of data streams depending on the bit rate of this data stream: thus, each of the said data blocks also has a corresponding TDMA slot.

In addition to the data packets that it generates itself or relays, each device of the network has at least one portion of its TDMA slot 220 in order to transmit control data.

In addition, the transmission cycle 210 has at least one time slot 240 called a contention zone (or slot) enabling any new node that wishes to get inserted into the network to send an insertion request. Access to this contention zone can be done equally well according to a free transmission mode or according to a mode called a collision detection mode (CSMA/CD: Carrier Sense Multiple Access/Collision Detection) starting from the instant when the total duration of the transmission does not exceed the duration of this contention slot. It is assumed here below in the document that this contention zone is situated always at the end of a cycle 210 after the TDMA slots allotted to the nodes of the network.

The management of the TDMA type access sequence is done by the unique node of the network (or master node) which decides on the allocation or withdrawal of TDMA slots to or from the nodes (in the case of insertion of a new node or the withdrawal of a node from the network) as well as the duration of each TDMA slot following a request for modification of bandwidth by a node of the network.

This master node can be fixed by configuration or designated by election when the network is initialized by classic methods known to those skilled in the art. In the context of the description, the master node chosen will be the source node 105 of FIG. 1. By opposition, the other nodes are designated as slave nodes.

Figure 3:
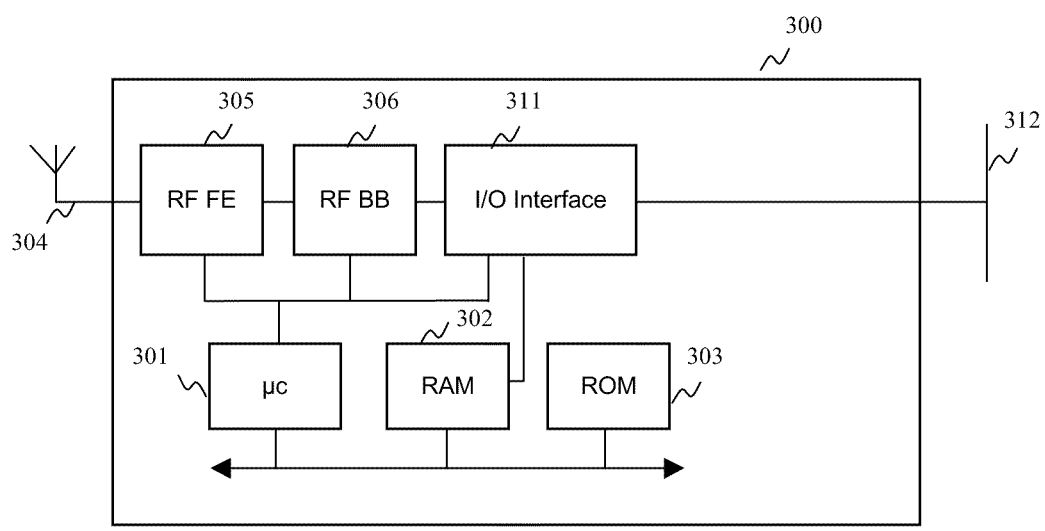

FIG. 3 shows the structure of a node of the network according to a particular embodiment of the invention.

The device 300 can represent the peripheral sender 105 or the receiver device 120 of the communications system 100. The device 300 can also represent any relay device 130

The reference 302 is a random-access memory or RAM working as a main memory, the capacity of this memory being capable of extension by an optional RAM connected to an optional expansion port (not illustrated in the present figure). The device 300 also has a computation unit or CPU (central processing unit) 301. When the communications device is powered on, the CPU 301 is capable of executing instructions from the ROM (read-only memory) 303. After the system has been powered on, the processor 301 is capable of executing instructions from the RAM 302 pertaining to a computer program once these instructions have been loaded from the ROM 303 or from an external memory (not illustrated in the present figure). A computer program of this kind, if executed by the CPU 301, prompts the execution of all or part of the steps of the algorithms or protocols illustrated by FIGS. 6 to 8, described here below.

The reference 305 designates a module responsible for matching the output signal of the baseband unit 306 before it is sent out by means of an antenna 304 (by frequency transposition and power amplification for example); this module is in addition adapted to receiving an antenna signal at 304 for delivery to the module 306. The module 306 performs an operation for demodulating the digital data received by the unit 305 and an operation for modulating the digital data received from the input/output interface (I/O interface) 311.

The set of the nodes 305 and 306 thus enables the sending and receiving of radio frames (also called data packets) whose content is described here below with reference to FIG. 4.

The module 311 is responsible, through the interface 312 (for example an HDMI type (High Definition Multimedia Interface) or RCA (Radio Corporation of America, manufacturers of an an electrical connector commonly used in the audio/video field) type interface 312, for giving the module 306 the audio data received from the source 105 or extracting and transmitting the audio data to the speakers of the receiver nodes 120 to 190. This module could also give/extract video data to/from a device 130 (this is the case of a screen connected to a wireless adapter, not shown in FIG. 1).

Figure 4:
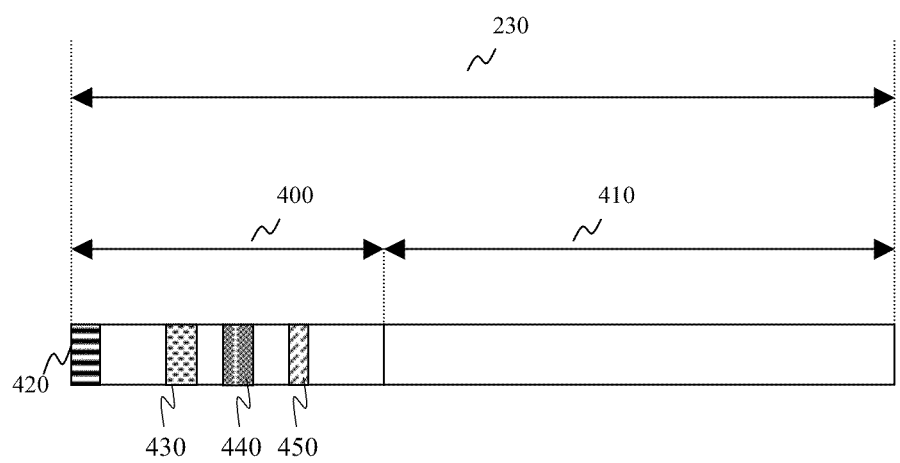

FIG. 4 provides a detailed illustration of the content of a data packet sent by a node of the network according to a TDMA type sequence (as referred in FIG. 2) according to a particular embodiment of the invention.

The nodes of the network communicate with one another by sending out data packets 230. Each data packet 230 is sub-divided into two major parts:

An information header field 400 for configuring the TDMA type access sequence. This field provides information especially on:
the identifier of the TDMA slot in which the packet 230 is transmitted and the identifier of the network to which the node having sent the packet belongs (field 420),
the descriptors relative to the current TDMA type access sequence (descriptor 430) (also called an active access sequence) and the following TDMA type access sequence (descriptor 440) (the comparison of these two descriptors provides information giving a notification of a forthcoming change of TDMA type access sequence) of the nodes of the network, these descriptors being described in detail with reference to FIG. 5,
an indicator of duration of relevance (450) (or information on duration of relevance) giving an indication of the duration of validity (also called duration of relevance) of the information concerning the TDMA type access sequences.

A control field 410 enabling each of the nodes of the network to communicate control information (applications needs in terms of bandwidth for example) to the other nodes of the network as well as applications data such as audio, video and other data . . . .

The positioning of the header field 400 and of the fields 420 to 450 within a packet 230 is the same whatever the packet 230. At reception of the packet 230, every node of the network or any node wishing to get inserted into the network can determine:
the TDMA type access sequence currently used in the network by analyzing the sequence descriptor 430.
the position in this access sequence of the received packet, in analyzing the field 420.

The use of the different information fields of FIG. 4 will be described more amply with reference to FIGS. 6 to 8.

It may be noted that in another embodiment of the invention, the data packet may explicitly contain a piece of information giving notification of a change of sequence. It may also contain modifications of the allocation of the TDMA time slot (constituting an access sequence information, on the same basis as the descriptor 440 which is another type of access sequence information). In this case, the slave node must determine the future access sequence as a function of the received information.

Figure 5:
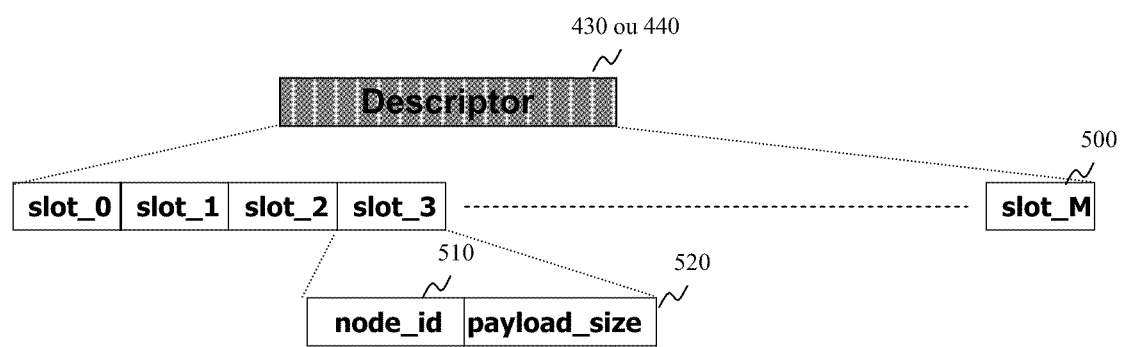
FIG. 5 illustrates an implementation of the TDMA type access sequence descriptor, according to a particular embodiment of the invention.

FIG. 5 illustrates an implementation of a TDMA type access sequence descriptor, according to a particular embodiment of the invention.

The descriptor 430 or 440 defines the TDMA type access sequence (or transmission sequence) 210 in characterising the M TDMA slots 500 (also called transmission time slots or TDMA slots) of the network by:
the identifier of the network node using the TDMA slot 510. This identifier, allotted by the master node of the network to each new node inserted in the network enables each node of the network to be identified uniquely;
the length of the radio frame corresponding to the TDMA slot 520, which can be expressed by the size of the number of radio symbols sent out by the concerned node (a radio symbol having a duration known to all the nodes of the network).

Within the cycle 210, a contention slot 240 is identified by a predefined IRDRES (Reserved IDentifier) value of the field 510. This enables a node wishing to join the network to determine the periods during which it must send a request for insertion in the network.

Figure 6:
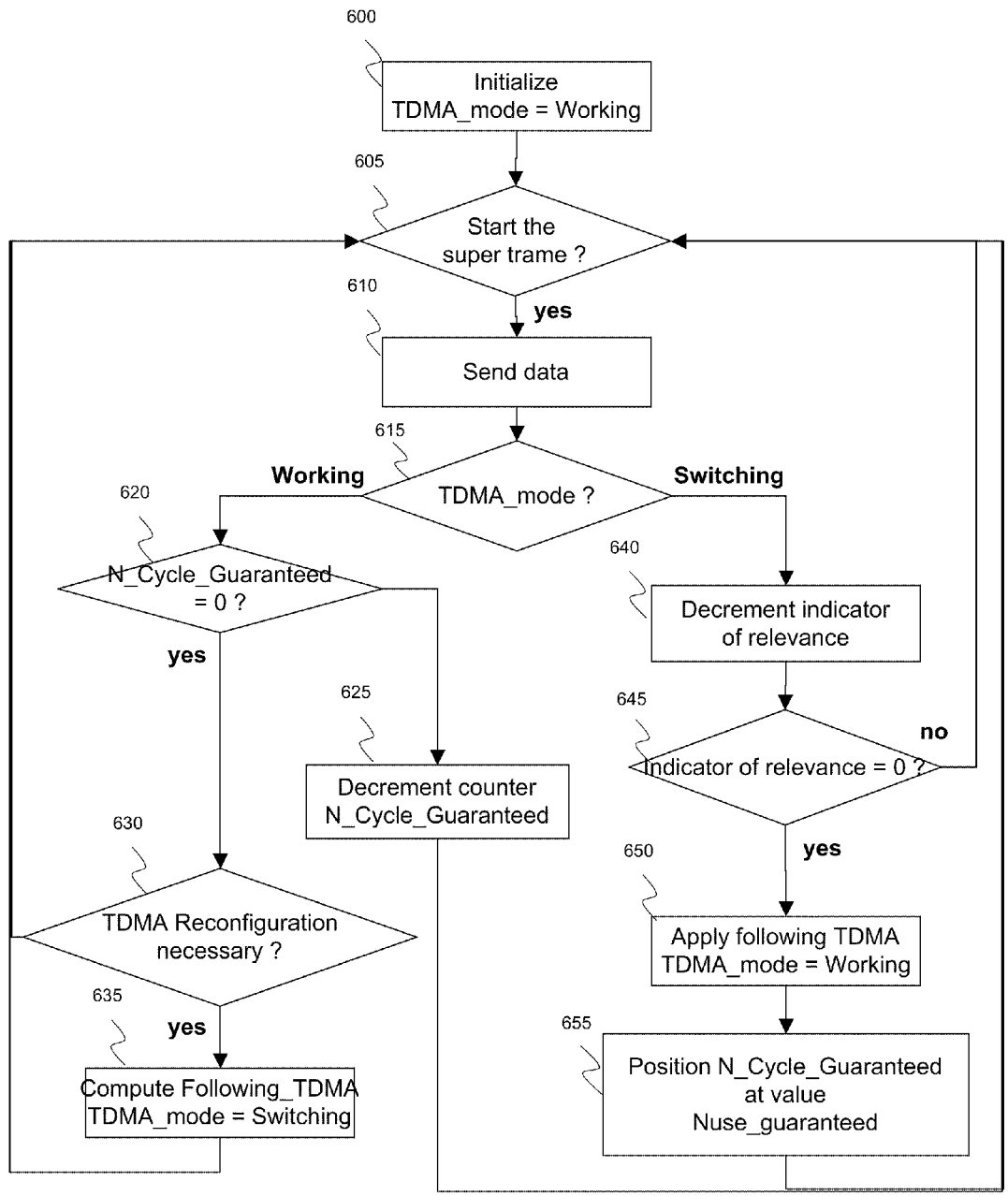
FIG. 6 is a flowchart for the updating of the TDMA type access sequence information by the master node of the network according to a particular embodiment of the invention.

FIG. 6 presents a flowchart of the updating of the TDMA type access sequence information implemented by the master node of the system according to a particular embodiment of the invention.

The master node is responsible for determining and deciding on the mode of operation of the network between the following two possible modes of operation:
"Working" mode of operation in which a TDMA type access sequence has been defined and is applied; the network then comprises a certain number of nodes which enable the working of an application (for example broadcasting of an audio stereo channel to two speakers). At the initial step 600, the TDMA type access sequence includes for example only the single master node and an internal variable TDMA_mode, this mode being set at the "Working" value;
"Switching" mode of operation: mode of operation in which the TDMA type access sequence will be modified following the insertion or removal of a node (addition or removal of a speaker) or the modification of the bandwidth requirements of an application (sending of a 5.1 type stream rather than stereo, setting up of a new application, stopping the execution of an application, etc).

In order to enable the slave nodes to know the mode of operation of the network and/or get synchronized during modifications of the TDMA type access sequence, at a step 605, the master node, at each start of a cycle 210 (or superframe) in the field 400 of its data frame 230, positions pieces of information characterising the TDMA type access sequence of the network.

When the mode of operation of the network is the "Working" node, the field 400 sent at the step 610 consists of the following information:
the current TDMA type access sequence or active access sequence, specified in the descriptor 430 (and here below called current TDMA), identifies the duration of each of the M TDMA slots (also represented by the size of the data transmitted during the TDMA slot considered) as well as the node to which the TDMA slot is allotted, as described by FIG. 5.

the following TDMA type access sequence, specified in the descriptor 440 (and here below designated as following_TDMA) is equal to the current TDMA type access sequence. The values of the descriptors 430 and 440 are therefore identical. In another embodiment of the invention, the value of the following_TDMA field could indicate only the modifications made in the TDMA intervals and would therefore be positioned at a zero value in the "Working" mode of operation.

the indicator of duration of relevance takes a constant (and maximum) value $N_{max}$. The master node always sends the value $N_{max}$ when it is in "Working" mode of operation. The closer the information on duration of relevance of a slave node is to this number (still in "Working" mode of operation), the more reliable is the information obtained by the slave node, and this makes it possible, in the event of shadowing, for a slave node to send on a lengthier duration than in the prior-art techniques. It must be noted that this value is used to determine the maximum duration (in numbers of cycles) during which a slave node of the network can continue to send without disturbing the network, when said slave node is subjected to a shadowing. This is described in detail in the description of FIG. 7. Consequently, $N_{max} \leq N_{switch}$ or $N_{switch}$ corresponds to the duration of a full transition phase (when the operating mode is the "Switching" mode) in order to prevent a node, masked during the last cycle of a mode of operation (when the mode of operation is the "Working" mode) before a transition phase (passage into "Switching" mode of operation) from sending until the next phase of operation (passage into "Working" mode of operation with a new active access sequence as compared with that used in the "Working" and "Switching" modes of operation). It shall be assumed here below in the description that $N_{max} = N_{switch}$.

When the mode of operation is the "Switching" mode, the field 400 sent during the step 610 consists of the following pieces of information:

the current transmission sequence (i.e. the active access sequence) indicated in the descriptor 430 (current_TDMA) identifies that node to which the allocation is made and the duration of each TDMA slot of the cycle 210, as described with reference to FIG. 5.

the following transmission sequence indicated in the descriptor 440 (following_TDMA) is positioned at a value different from that of the descriptor 430 (current_TDMA) indicating a different distribution of the TDMA intervals (in terms of order and/or size/duration) or a different number of TDMA intervals allocated (insertion or withdrawal of the node). In another embodiment of the invention, the value of the descriptor 440 (following_TDMA) could indicate only the modifications made to the TDMA intervals.

the indicator of the duration of relevance takes a value $N_{rel}$, indicating the remaining duration (in terms of cycles 210) before the use of the following transmission sequence (following_TDMA) instead of the current transmission sequence current_TDMA. It may be noted that, at the beginning of a transmission phase, $N_{rel}$ is initialized at $N_{switch}$.

The master node then determines the progress of the TDMA sequence for the next cycle 210. To this end, the node determines (step 615) the mode of normal operation of the network (value of the variable TDMA_mode).

At the step 615, if the current mode of operation is the "Switching" mode, the master node diminishes the value of the indicator of duration of relevance $N_{rel}$ (step 640) of a unit (i.e. by one cycle) indicating that the use of the new TDMA type access sequence (following_TDMA) is imminent. When this indicator reaches the value zero (test at the step 645) then the re-configuration is done during the next cycle 210. The following transmission sequence following_TDMA then becomes the transmission sequence to be applied and the internal variable TDMA_mode is now equal to "Working" (step 650). The variation N_Cycle_Guaranteed is then initialized at a value $N_{use\_guaranteed}$ corresponding to a minimum number of cycles 210 before any new configuration. This duration (N_Cycle_Guaranteed*the duration of the cycle 210) is aimed at preventing re-configurations of transmission sequence that are too close together in time and thus enables the master node to manage several concurrent requests for modification of the TDMA type access sequence during the next re-configuration.

If the current mode of operation is the "Working" mode, the master node first of all ascertains that a use of the current TDMA type access sequence (current_TDMA) after re-configuration has taken place during a minimum duration (test 620 of the value of the internal variable N_Cycle_Guaranteed).

If this minimum duration is not achieved, the internal variable N_Cycle_Guaranteed can be decremented by one unit (i.e. by one cycle) during a step 625.

When the minimum duration of use of the current TDMA type access sequence is reached, a new configuration can be envisaged. The test 630 then determines whether a new re-configuration is required.

If no re-configuration is needed then, at the next cycle, the information characterising the mode of operation of the network indicate an "Working" mode of operation. If, on the contrary, a re-configuration is decided, the master node determines the new value of the descriptor 440 (following_TDMA) and positions the variable TDMA_mode at "Switching". The indicator of duration of relevance ($N_{rel}$ is then set at the value $N_{switch}$, corresponding to the time remaining before application of the new TDMA type access sequence at the level of the network.

Figure 7:
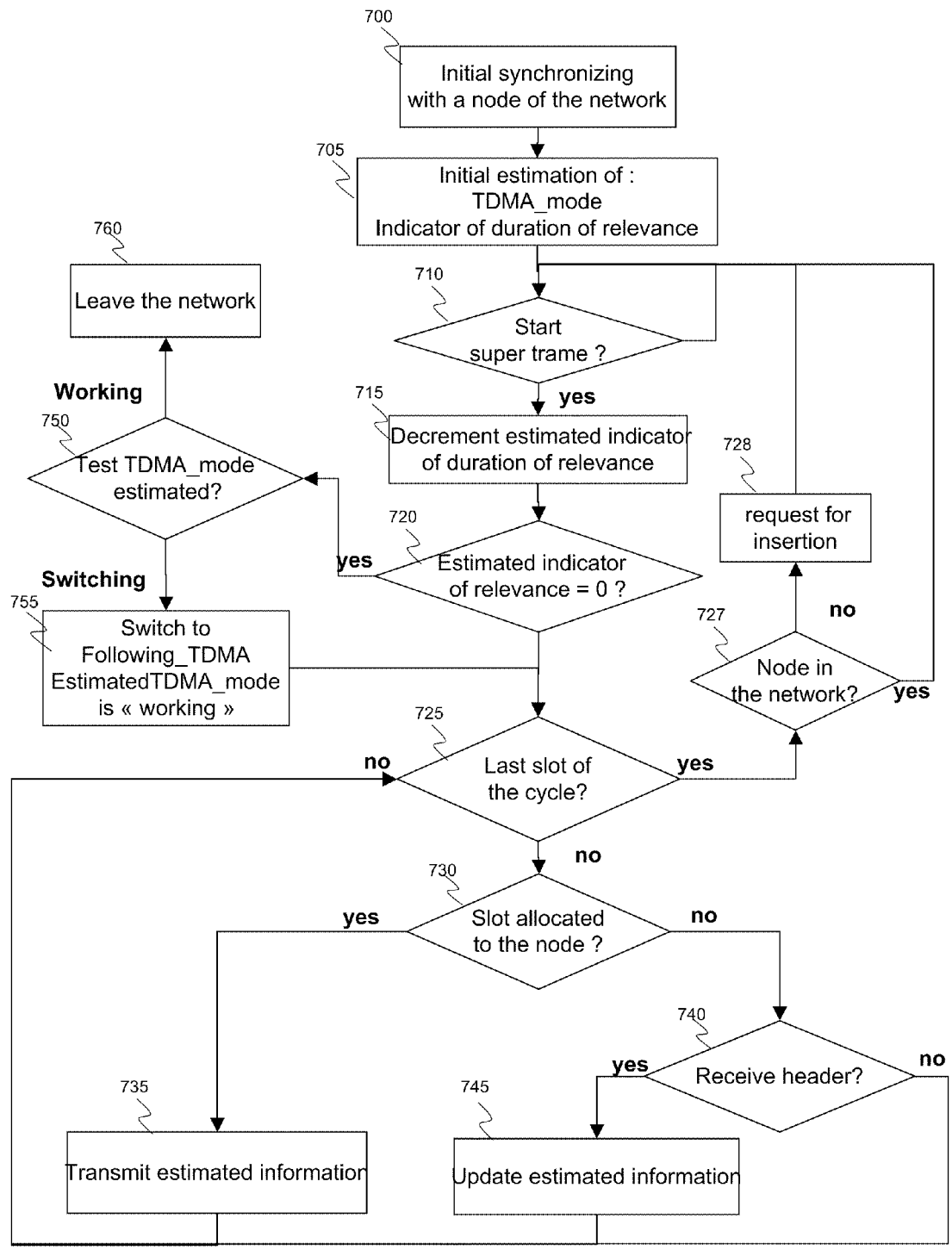
FIG. 7 is a flowchart of estimation of a TDMA type access sequence information by means of a slave node of the network according to a particular embodiment of the invention.

FIG. 7 presents a flowchart for estimating applicable TDMA type access sequence information implemented by a slave node of the system according to a particular embodiment of the invention.

When the algorithm is initialized (step 700), the node performs an initial synchronization phase of the node with a node of the network. This initial phase of synchronization corresponds to:

a phase of reception of a signal coming from one of the nodes forming part of the network (either master or slave);

a phase of discovery of the current TDMA type access sequence (or active) TDMA type access sequence making it possible, on the basis of the received packet, to determine the position of the contention slot. During this phase, the decoding of the piece of information current_TDMA (descriptor 430) enables the identification of the non-allocated TDMA slots (node_ID=IDRES) and their position in the cycle 210. In using the received information (420) and on the basis of the identifier of the node that has transmitted the packet, it is possible to compute the duration remaining before the available contention slot (number and duration of allocated TDMA slots as described by the TDMA type access sequence), then, at a phase for determining the antenna angle to be capable of receiving information from each node of the network.

Following this phase, the node is capable (step 705) of determining, on the basis of the received descriptors 430 and 440, firstly whether the node is in switching operational mode or in working operational mode (by comparison with the descriptors 430 (current_TDMA) and 440 (next_TDMA)) and secondly the value of the indicator of duration of relevance associated with the mode of operation.

From the information received in the information header field for configuring the TDMA type access sequence (TDMA_current descriptor 430 and field 420) and of the identifier of the node that has transmitted the packet, it is also possible to determine the starting instant of the superframe to perform the step 710.

In a step 715, the node then decrements its estimation of the indicator of duration of relevance signifying that, in the absence of reception of information from another node, it guarantees that the pieces of information pertaining to the transmission sequence which it will send (in the TDMA slot that has been allocated to it in the cycle 210) will be valid only for the duration $N_{rel}$ (estimated)*duration of the cycle 210.

Following this operation, the node checks to see (720) whether its estimation of duration of relevance has not reached the critical threshold (zero value) indicating that the node has undergone shadowings such that it is no longer able to ensure that its estimation corresponds to the real mode of operation of the current network. If this is the case, two possibilities arise (750):

the estimated mode of operation corresponds to a "Working" mode of operation. In this case, the node has no longer received any information pertaining to the organizing of the sequence of transmission of another node from the last updating of its estimations (at most $N_{max}$ cycles). The node must then leave the network (760), because it is no longer capable of determining whether the TDMA interval (which was hitherto allotted to it) or the zone of contention for a node wishing to get inserted has been modified by the master node. The node then leaves the network and starts again from the initial step 700 for a new insertion into the network;

the estimated mode of operation corresponds to an "Switching" mode of operation. Although an estimation is made of the instant of changing of TDMA type access sequence, the slave node, by its operation 715, remains synchronous with the effective instant of change of TDMA type access sequence, i.e. it can perform the operation of change from the TDMA type access sequence 755 to the following_TDMA whether or not there is a shadowing. Thus, a node masked at the start of the transition phase can continue to participate in communications during the maximum time corresponding to:

$((N_{switch}+N_{use\_garanteed})$*cycle time 210)

for a slave node knows that no operation of modification after a change of TDMA type access sequence will take place before the minimum time $N_{use\_garanteed}$. It therefore cannot guarantee the validity of the new TDMA type access sequence after a change in TDMA type access sequence without any other information except for this period of time.

Thus, a node that gets inserted into the network, during a phase of change, can have available a duration (at least equal to $N_{use\_garanteed}$) enabling it to continue to send and to do so despite a possible shadowing of itself, i.e. its time slot is guaranteed to it for this duration.

When the estimation of duration of relevance has not achieved a critical threshold, the node will be able to continue to receive and/or transmit during the new cycle 210. It will then determine whether the zone of contention of the current cycle has been reached (step 725).

If the answer is yes, then:

a node inserted into the network has finished receiving the information which can enable it to update the TDMA type sequence information. It then waits for the start of the next cycle (step 710);

a node wishing to get inserted then makes a request for insertion in the current contention zone (step 727 and then step 728). It must be noted that during the step 728, the node may decide not to send its request for insertion according to its estimation of the duration of relevance (especially if this duration is not above a minimum threshold enabling the master node to deal with this request) and/or as a function of the mode of operation of the network (especially if there is no sending during a phase of re-configuration in progress).

If there remain TDMA network access slots (at least one) that have not yet elapsed in the current cycle, two cases may occur:

the TDMA slot to come is allotted to the node implementing the algorithm. This is determined by checking the correspondence between the identifier allotted to the node during its subscription to the network and the identifier (field 510) of the node to which the current time slot is assigned in the current transmission sequence (as indicated in the descriptor 430). This descriptor will then send, in its header; the content of the information estimated for the transmission sequence (steps 730-735).

the TDMA slot to come is that of another node of the network. Thereupon:

either (transition from the step 740 to the step 725) the node cannot accurately receive the data sent by the sender node because of its shadowing or because of disturbance corrupting the received data;

or (transition from the step 740 to the step 725 through the step 745) the node accurately receives the data sent by the sender node and more particularly the header containing the pieces of information on transmission sequence. It can then use these pieces of information to refine and modify its estimation of the evolution of the TDMA type access sequence. This updating of the estimation is explained in greater detail with reference to FIG. 8. During these steps, a test for checking the identifier of the network of the information (information contained in the field 420) also makes it possible to ensure not taking account of the data of the data (for example the TDMA type access sequence) relative to a neighboring network. This case corresponds for example to the co-existence of two networks in a same dwelling or a same room of a dwelling.

It can happen that a node will never receive from the master node and will therefore have to rely on the most relevant estimation of the other nodes to remain synchronized with the master node (indirectly in this case).

Figure 8:
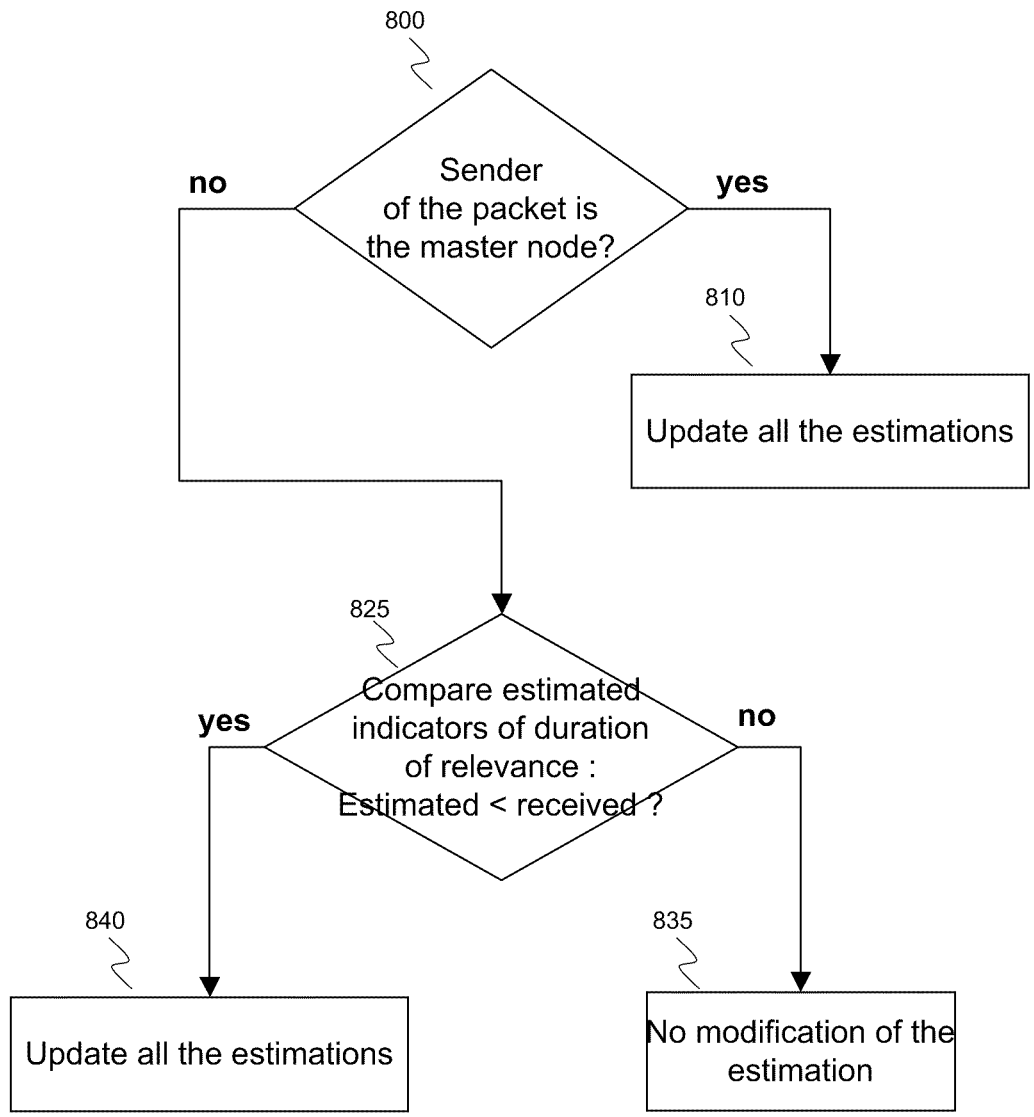
FIG. 8 is a flowchart of estimation of a TDMA type access sequence by a slave node of the system according to a particular embodiment of the invention.

FIG. 8 is a flowchart for updating the estimation of the TDMA type access sequence implemented by a slave node of the network according to a particular embodiment of the invention.

The algorithm implemented consists in performing a re-updating of the estimation of the node if the pieces of information received are more relevant than the estimation. These items of information are more relevant either because they are updated following a direct reception of this information from the master node or from a node that has more recently received this information from the master node (non-shadowed for example).

At a step 800, it is determined whether the node from which the information is received is the master node or a slave node. Should the information come from the master node, a step 810 is executed, in which the node considered carries out an updating, with the received information, of its estimated indicator of duration of relevance in assigning to it the received value, an updating if need be of its parameters storing the following TDMA type access sequence and the mode of operation of the network.

Should the information not come from the master node, a step 825 is performed, in which the indicators of duration of estimated and received relevance are compared. The identifier of the duration of relevance having the highest value is associated with the information to be kept (step 840). Indeed, an identifier of duration of relevance of this kind indicates that the sender node has undergone the shadowing to a lesser extent and has therefore more recently received confirmation of the validity of its pieces of information estimated by a node closer to the master node (or directly from the master node). It must be understood that a "node closer to the master node" is a node for which the pieces of information coming from master node are received by means of a smaller number of relay nodes for the node considered.

If the indicator of duration of relevance received has a value below that of the estimated indicator of duration of relevance, then the node from which the information has been received has undergone more shadowings than the slave node considered. Since this information is less reliable, no updating of estimations is done (step 835).

It must be noted that the indicator of duration of relevance associated with the "Switching" mode of operation is necessarily greater than the indicator of duration of relevance in "Working" mode of operation.

In addition, as in the "Switching" operating mode, the master node decrements the indicator of duration of relevance at each cycle (as is also done by the slave nodes); this ensures that once the "Switching" mode of operation is detected, the nodes make the change in TDMA type access sequence at the same transmission cycle (once the indicator of duration of relevance has reached the value zero).

When the two nodes disagree on the content of the TDMA type access sequence descriptors (especially the descriptor 440), the node reflecting a "Switching" mode of operation can only receive (directly or indirectly) this information from the master node (the only one capable of initiating this phase).

Here, by way of an example, numerical examples are given for different parameters mentioned here above.

Let us assume a transmission cycle 210 with a duration of 1 ms formed by M=10 TDMA slots 220. Between two TDMA slots, we define an inter-access time with a duration of 2 µs, used to absorb the clock drifts between the nodes of the network and thus prevent transmission phase overlaps.

Taking as a clock (for each node of the system), a 24.576 MHz clock+/−10 ppm, during a cycle 210, the possible variation of an oscillator is +/−10 ns. The maximum divergence of variation between two synchronized nodes is therefore +/−20 ns.

A maximum number of cycles without transmission overlap is then 2 µs/20 ns=100 (giving 90 by introducing a margin of imprecision) for a node losing synchronization with the master node.

By using the value $N_{switch}$=45, (and $N_{max}$=45), if a shadowing occurs just after the first cycle of a transition phase, the node is capable of participating in communications for 45 cycles+N_Cycle_Guaranteed cycles (with N_Cycle_Guaranteed<=$N_{max}$). Thus, we can be sure of not having any overlaps during this period of time.

The adjustment of this value is done by compromise between improvement of the precision of the clocks (to the detriment of prices) and increasing the inter-access time (leading to a loss of bandwidth (greater amount of time without transmission)).

The invention claimed is:

1. Method for managing access to a communications network clocked in transmission cycles by a master node, wherein, during a given transmission cycle, a slave node of said network performs steps for:
    obtaining an active access sequence, according to which the nodes access a physical medium, applicable to said given transmission cycle;
    obtaining a piece of information on duration of relevance associated with said obtained active access sequence, said piece of information on duration of relevance giving an indication of the duration of validity of the information concerning said access sequence;
    carrying out a first check that at least one packet is received by said slave node during the given transmission cycle, according to said active access sequence;
    in the event of a positive first check, determining an access sequence for a following transmission cycle as a function of pieces of information contained in said received packet or packets; and
    in the event of a negative first check, determining an access sequence for the following transmission cycle as a function of said piece of information on duration of relevance associated with the obtained active access sequence,
    wherein, if the piece of information on duration of relevance associated with the active access sequence is non-zero, the information on duration of relevance for the next transmission cycle is obtained by reducing the information on duration of relevance for the given transmission cycle.

2. Method according to claim 1, wherein, in the event of a positive first check, said slave node performs a step for:
    performing a second check to see if one of the received packet or packets comes from the master node, and
    in the event of a positive second check, the access sequence for the next transmission cycle is indicated in said packet coming from the master node.

3. Method according to claim 2, wherein, in the event of a negative second check, said slave node performs a step for:
    performing a first comparison between the information on duration of relevance associated with said obtained active access sequence and a piece of information on duration of relevance associated with an access sequence indicated in a said received packet; and
    the access sequence for the following transmission cycle is determined as a function of the result of said first comparison.

4. Method according to claim 3, wherein, if the piece of information on duration of relevance associated with said active access sequence is greater than or equal to the piece of information on duration of relevance associated with the access sequence indicated in said received packet, then the access sequence for the next transmission cycle is the obtained active access sequence.

5. Method according to claim 3, wherein, if the piece of information on duration of relevance associated with said active access sequence is smaller than the information on duration of relevance associated with the access sequence indicated in said received packet, the piece of information on duration of relevance associated with said active access sequence is replaced by the piece of information on duration of relevance indicated in said received packet, and the access sequence for the next transmission cycle is indicated in said received packet.

6. Method according to claim 1, wherein, if the piece of information on duration of relevance associated with said active access sequence is zero, said slave node in addition performs steps for:
  performing a third check to ascertain that at least one piece of information on notification of change of sequence has been received by said node during a previous transmission cycle and notifying a subsequent change of access sequence;
  in the event of a positive third check, determining the access sequence for the next transmission cycle as a function of a piece of information on access sequence associated with said information notifying a change of sequence; and
  in the event of a negative third check, preventing send access from said slave node to said network starting from said following transmission cycle.

7. Method according to claim 1, wherein, in the event of a negative first check, and if the piece of information on duration of relevance associated with the obtained active access sequence is non-zero, the access sequence for the next transmission cycle is equal to the active access sequence.

8. Method according to claim 1, wherein said slave node in addition performs a step for:
  sending, according to the obtained active sequence, in the given transmission cycle, a packet comprising said active access sequence for the given transmission cycle obtained, and information on the duration of relevance associated with said given access sequence.

9. Method for managing access to a communications node clocked in cycles of transmission by a master node, wherein, during a given transmission cycle, a master node performs a step for:
  sending an active access sequence, according to which the nodes access a physical medium, applicable for the given transmission cycle;
  sending a piece of information on duration of relevance associated with said sent active access sequence, said piece of information on duration of relevance giving an indication of the duration of validity of the information concerning said access sequence,
  wherein a slave node obtains the active access sequence, and carries out a first check that at least one packet is received by said slave node during the given transmission cycle, according to said active access sequence, wherein in the event of a positive first check, the slave node determines an access sequence for a following transmission cycle as a function of pieces of information contained in said received packet or packets, and wherein in the event of a negative first check, the slave node determines an access sequence for the following transmission cycle as a function of said piece of information on duration of relevance associated with the obtained active access sequence, and
  wherein, if the piece of information on duration of relevance associated with the active access sequence is non-zero, the information on duration of relevance for the next transmission cycle is obtained by reducing the information on duration of relevance for the given transmission cycle.

10. Method according to claim 9, wherein the master node performs a step for:
  sending a piece of information notifying a change of sequence, associated with a piece of information on access sequence to be used for a forthcoming cycle, making it possible to inform the slave nodes of a modification of access sequence which will be effective as a function of the value of the associated piece of information on duration of relevance.

11. A non-transitory computer-readable storage means storing a computer program comprising a set of instructions executable by a computer for implementing a method for managing access to a communications network clocked in transmission cycles by a master node, wherein, during a given transmission cycle, a slave node of said network performs steps for:
  obtaining an active access sequence, according to which the nodes access to the physical medium, applicable to said given transmission cycle;
  obtaining a piece of information on duration of relevance associated with said obtained active access sequence, said piece of information on duration of relevance giving an indication of the duration of validity of the information concerning said access sequence;
  carrying out a first check that at least one packet is received by said slave node during the given transmission cycle, according to said active access sequence;
  in the event of a positive first check, determining an access sequence for a following transmission cycle as a function of pieces of information contained in said received packet or packets; and
  in the event of a negative first check, determining an access sequence for the following transmission cycle as a function of said piece of information on duration of relevance associated with the obtained active access sequence,
  wherein, if the piece of information on duration of relevance associated with the active access sequence is non-zero, the information on duration of relevance for the next transmission cycle is obtained by reducing the information on duration of relevance for the given transmission cycle.

12. A non-transitory computer-readable storage means storing a computer program comprising a set of instructions executable by a computer for implementing a method for managing access to a communications node clocked in cycles of transmission by a master node, wherein, during a given transmission cycle, a master node performs a step for:
  sending an active access sequence, according to which the nodes access a physical medium, applicable for the given transmission cycle;
  sending a piece of information on duration of relevance associated with said active access sequence sent, said piece of information on duration of relevance giving an indication of the duration of validity of the information concerning said access sequence,
  wherein a slave node obtains the active access sequence, and carries out a first check that at least one packet is received by said slave node during the given transmission cycle, according to said active access sequence, wherein in the event of a positive first check, the slave node determines an access sequence for a following transmission cycle as a function of pieces of information contained in said received packet or packets, and wherein in the event of a negative first check, the slave node determines an access sequence for the following transmission cycle as a function of said piece of information on duration of relevance associated with the obtained active access sequence, and wherein, if the piece of information on duration of relevance associated with the active access sequence is non-zero, the information on duration of relevance for the next transmission cycle is obtained by reducing the information on duration of relevance for the given transmission cycle.

13. Slave node belonging to a communications network clocked in transmission cycles by a master node, comprising:

means for obtaining an active access sequence and a piece of information on duration of relevance associated with said obtained active access sequence, wherein the active access sequence defines a sequence according to which the nodes access a physical medium applicable to said given transmission cycle, and wherein the piece of information on duration of relevance associated with said obtained active access sequence gives an indication of the duration of validity of the information concerning said access sequence;

means for checking that at least one packet is received by said slave node during the given transmission cycle, according to said active access sequence;

first means for determining an access sequence for a following transmission cycle as a function of pieces of information contained in said received packet or packets, said first means for determining being activated in the event of a positive first check; and second means for determining an access sequence for the following transmission cycle as a function of said piece of information on duration of relevance associated with the obtained active access sequence, said second means for determining being activated in the event of a negative first check, wherein, if the piece of information on duration of relevance associated with the active access sequence is non-zero, the information on duration of relevance for the next transmission cycle is obtained by reducing the information on duration of relevance for the given transmission cycle.

* * * * *